(12) United States Patent
Bryant et al.

(10) Patent No.: US 7,704,000 B2
(45) Date of Patent: Apr. 27, 2010

(54) PRINTER DOCK WITH TWO POSITION TRAY

(75) Inventors: Steven M. Bryant, Holly, NY (US); Steven S. Chapman, Corfu, NY (US); James G. Rydelek, Henrietta, NY (US)

(73) Assignee: Eastman Kodak Company, Rochester, NY (US)

( * ) Notice: Subject to any disclaimer, the term of this patent is extended or adjusted under 35 U.S.C. 154(b) by 826 days.

(21) Appl. No.: 11/481,302

(22) Filed: Jul. 5, 2006

(65) Prior Publication Data

US 2008/0008516 A1    Jan. 10, 2008

(51) Int. Cl.
B41J 11/58 (2006.01)
B41J 13/10 (2006.01)

(52) U.S. Cl. ............... 400/625; 347/104; 271/145; 271/162

(58) Field of Classification Search .............. None
See application file for complete search history.

(56) References Cited

U.S. PATENT DOCUMENTS

| | | | | |
|---|---|---|---|---|
| 3,837,464 A * | 9/1974 | Baughman et al. | ........... | 400/685 |
| 4,853,711 A * | 8/1989 | Piatt | ............. | 271/162 |
| 5,620,269 A * | 4/1997 | Gustafson | ........... | 347/104 |
| 6,276,852 B1* | 8/2001 | Osmus | ........... | 400/624 |
| 6,494,633 B1* | 12/2002 | Crosby et al. | ........... | 400/88 |
| 6,830,401 B1* | 12/2004 | Hwang et al. | ........... | 347/104 |
| 2003/0081101 A1* | 5/2003 | Khormaei et al. | ........... | 347/104 |
| 2003/0210333 A1 | 11/2003 | Manico et al. | | |
| 2004/0169327 A1 | 9/2004 | Swayze et al. | ........... | 271/145 |
| 2005/0146616 A1 | 7/2005 | Parulski et al. | | |
| 2006/0061644 A1 | 3/2006 | Proulx et al. | ........... | 347/104 |

FOREIGN PATENT DOCUMENTS

JP     5097314     4/1993

OTHER PUBLICATIONS

U.S. Appl. No. 09/570,089, filed May 12, 2000, entitled "A Color Digital Printer Having a Graphical User Interface 30 for Displaying and Selecting Images From a Digital Storage Medium" Romano et al.

* cited by examiner

*Primary Examiner*—Jill E Culler
(74) *Attorney, Agent, or Firm*—Robert Luke Walker; Nelson Adrian Blish

(57) ABSTRACT

A printer dock for use with a digital data terminal, has a housing having a paper inlet portal, a first tray receiver, and a second tray receiver. The first tray receiver adjoins the paper inlet portal. The second tray receiver is disposed in spaced relation to the paper inlet portal. A printer engine is disposed in the housing. The printer engine has a paper path extending from an entrance facing the paper inlet portal. A device interface is operatively connectable to the data terminal and the printer engine. A paper tray is alternately mountable in a use position and a storage position. The paper tray, in the use position, is located in the first tray receiver and is disposed in operative relation to the printer engine. The paper tray, in the storage position, is located within the second tray receiver.

9 Claims, 20 Drawing Sheets

US 7,704,000 B2

PRINTER DOCK WITH TWO POSITION TRAY

FIELD OF THE INVENTION

The invention relates to printer docks and related methods and more particularly relates to a printer dock having a two-position tray.

BACKGROUND OF THE INVENTION

A printer docks is a hybrid product that combines a dock for recharging a handheld device referred to herein as a "data terminal", with a printer capable of printing image files from the data terminal. In many cases, printer docks allow printing with or without a connection to a computer. Other functions, such as connectability to a network and CD printing, can also be provided by a printer dock, as disclosed, for example in U.S. Patent Publication US 2003/0210333 A1.

Printer docks can be small in size allowing easy portability. With some printer docks such as the Kodak EasyShare Printer Dock Plus, Series 3, marketed by Eastman Kodak Company of Rochester, N.Y., a tray for printable media is detachable from a receiver in a housing of the printer dock to allow easier transport. A carrying case that can hold the housing and tray is also marketed. The case is convenient to use, but is less convenient to store and locate when needed, since the case is likely to be packed away for occasional use, while the printer dock is left out for more regular use. The case is also inconvenient for transporting the printer dock over short distances, such as from room to room of a house.

Since a printer dock can be used for recharging a data terminal, a convenient location for the printer dock in a consumer's home or place of work is where the data terminal is readily accessible. This can be problematic, since such a location often has very little available surface space. The size of a printer dock can deter convenient placement, which makes printer dock use less convenient.

Printers that are similar to printer docks, but lacking the docking features have similar shortcomings in terms of convenient placement.

It would thus be desirable to provide improved printers, printer docks, and systems, which do not have the above shortcomings.

SUMMARY OF THE INVENTION

The invention is defined by the claims. The invention, in broader aspects, provides a printer dock for use with a digital data terminal. The printer dock has a housing having a paper inlet portal, a first tray receiver, and a second tray receiver. The first tray receiver adjoins the paper inlet portal. The second tray receiver is disposed in spaced relation to the paper inlet portal. A printer engine is disposed in the housing. The printer engine has a paper path extending from an entrance facing the paper inlet portal. A device interface is operatively connectable to the data terminal and the printer engine. A paper tray is alternately mountable in a use position and a storage position. The paper tray, in the use position, is located in the first tray receiver and is disposed in operative relation to the printer engine. The paper tray, in the storage position, is located within the second tray receiver.

It is an advantageous effect of the invention that improved printers, printer docks, and systems are provided, in which transport is improved and surface space needed is reduced.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
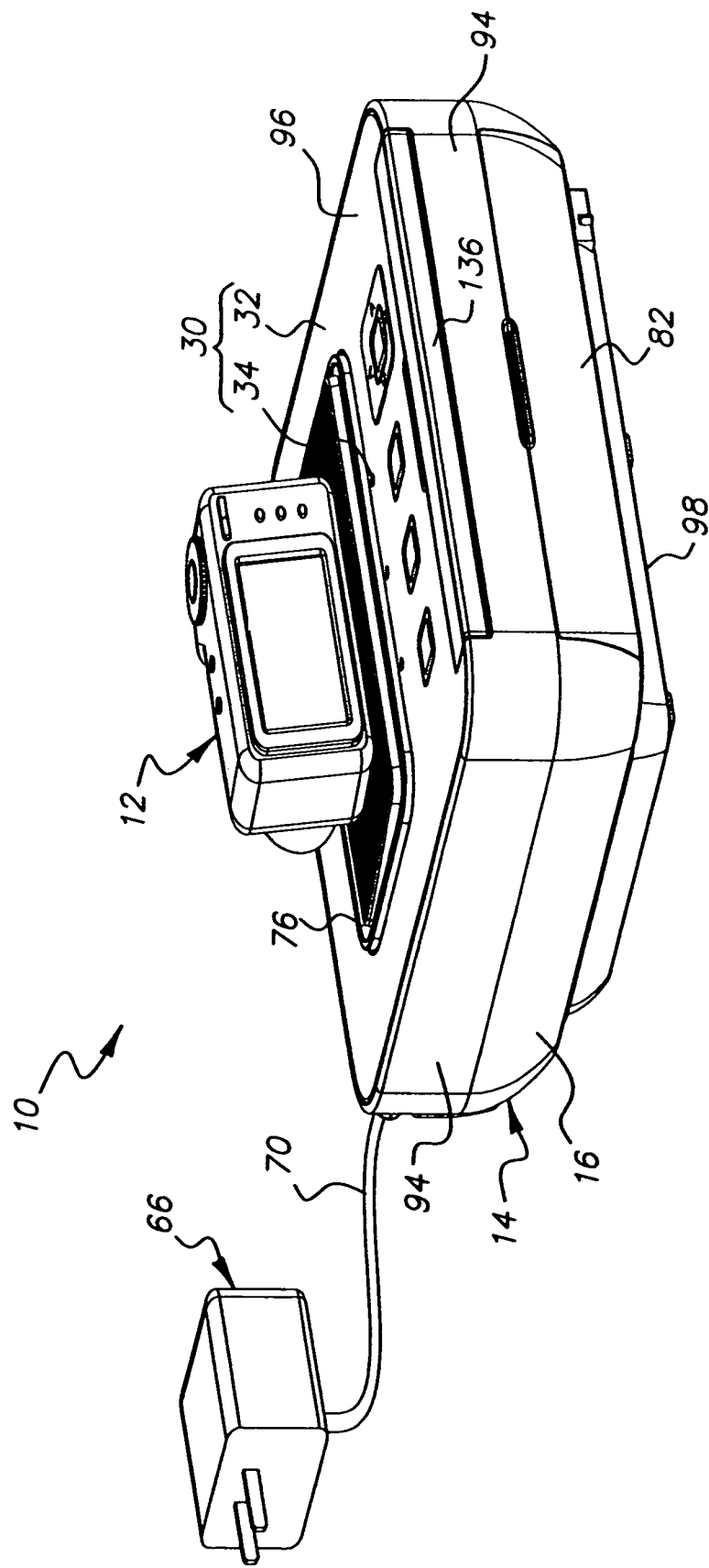
FIG. 1 is a front, left perspective view of the system of the invention. The data terminal is a camera, which is docked with the printer dock. The paper tray shown in the stored position. The handle is shown in a retracted position.

Referring to FIGS. 1-2, 7-8, and 21, a system 10 has a data terminal 12 and a printer dock 14. The printer dock 14 has a housing 16 and a printer engine 18, control unit 20, within the housing 16. The printer dock 14 has a paper tray 24 that supplies printable media to the printer engine 18. (For convenience, printable media is referred to herein as "paper"; however, it will be understood this term is used to broadly refer to printable sheet media, inclusive of layered composite sheets and non-cellulose media, such as polyester sheets.) The printer dock 14 has one or more interfaces for input and output to and from the control unit 20. A device interface 28 (shown in FIG. 7) is operatively connectable to the data terminal 12. A user interface 30 has input and output components 32,34 for the user. A communications unit 36 that is operatively connectable to an external device or network 38 can also be provided.

The term "data device" is used herein to refer to a portable item, which includes portable memory capable of holding a plurality of data files. Examples of data devices include electronic memory cards, such as SD cards.

The term "data terminal 12" is used herein to refer to a data device having an internal power supply (not shown), internal memory 44 capable of holding a plurality of data files, and a display 46 capable of displaying the data files stored in the internal memory 44. The data terminal 12 also includes a terminal interface 48 compatible with the device interface 28 and a processor 50 capable of controlling the components of the data terminal 12. A data terminal 12 can be limited to displaying data files in the internal memory 44 or can also provide additional functions. For example, the data terminal 12 can be a cellular telephone, a portable telephone, a photograph viewer, a personal digital assistant, or a personal computer. The data terminal 12 can also be a digital camera or digital camera functions can be provided in one of the previously listed devices.

The data terminal 12 stores printable data in the data files of the internal memory 44. The printable data can be text, but it is preferred that the printable data is images. The data files that supply the images can have individual still images, slide shows, video segments, multi-media presentations, or any combination of these. Audio and/or other additional digital content can be associated with the images. The data terminal 12 can additionally store data files of non-printable data, such as audio files. In the illustrated embodiments, the data terminal 12 includes a capture unit 52, that is, the data terminal 12 is a digital camera. The image capture unit 52 includes a lens system 55, imager 56, audio capture unit 58, and signal processor 60. The camera has buttons and/or other actuators 54 that are usable for both image capture and review. For convenience, the data device and data terminal are generally discussed herein in terms of a digital camera having data files storing still digital images. It will be understood that comparable considerations apply to digital video cameras and to other non-camera data terminals and data devices, subject to the limitations of such devices.

The printer engine 18 can record images using a wide variety of printing technologies including, conventional four color offset separation printing or other contact printing, silk screening, dry electrophotography such as is used in the NexPress 2100 printer sold by Eastman Kodak Company, Rochester, N.Y., USA, thermal printing, dye ablation printing, drop on demand ink jet technology, and continuous inkjet technology. The printer engine 18 can have the capability of generating color images or can be limited to monotone images such as black and white, grayscale or sepia toned images. The printer engine 18 can include or be limited to use of one or more specialized inks, such as luminescent inks, magnetic inks, conductive inks, and the like. The printer engine 18 is illustrated by a printing assembly 19 and a medium advance 21 (illustrated as a pickup mechanism and series of rollers. It will be understood that this illustrative and not limiting on the features of the printer engine 18. For example, the printing assembly 19 can be a thermal print head and traverse mechanism or a full width inkjet head.

The control unit 20 operates the printer engine 18 and other features of the printer dock 14. The control unit 20 can include, but is not limited to, a programmable digital computer, a programmable microprocessor, a programmable logic processor, a series of electronic circuits, a series of electronic circuits reduced to the form of an integrated circuit, or a series of discrete electrical elements. The control unit 20 utilizes memory 62 and communication paths 64 between the components. The printer engine 18 can optionally include one or more sensors (not shown) for monitoring conditions which would affect the operation of the printer engine 18, such as, environmental conditions, position and orientation, internal conditions within the printer dock, paper status and condition, and the like.

Memory 62 can include conventional memory devices including solid state, magnetic, optical or other data storage devices. Memory 62 can be fixed within the printer dock 14 or can be removable. The memory 62 can include a hard drive, a disk drive for a removable disk such as an optical, magnetic or other disk memory (not shown) and a memory card slot that holds a removable memory such as a removable memory card and has a removable memory card interface for communicating with removable memory. Data including but not limited to control programs, digital images and metadata can also be stored in a remote memory system (not shown) that is external to the printer dock 14 such as a personal computer, computer network or other digital memory system such as a so called "WI-FI" enabled memory card.

A power source 66 provides electrical current to other components of the printer dock 14. The power source 66 can be in the form of batteries or the like and/or circuit elements necessary to provide an electrical current from an outside source, such as line voltage. In the illustrated embodiments, the power source 66 includes an internal rechargeable battery (indicated by arrow 68) and power cord 70 to an external power supply (illustrated, in FIG. 1, as a corded transformer connectable to electrical line voltage) for recharging.

The user interface 30 has one or more input components 32 and can have one or more output components 34. The components 32,34 are accessible to the user. Appropriate control circuitry can be provided as a part of the input and output components 32,34 or as a part of the control unit 20. In FIGS.

1-2, the user interface 30 includes input components 32 in the form of three two-state buttons and a 4-way switch and the output components 34 in the form of light emitting diodes.

Each input component 32 is a transducer or other device capable of receiving an input from a user and converting this input into a form that can be used by the control unit 20. Examples of suitable input components 32 include: a two-state button, a dial, a keypad system, a touch screen input, a touch pad input, a 4-way switch, a 6-way switch, an 8-way switch, a stylus system, a trackball system, a joystick system, and a keyboard. An input component 32 can take in information in a form that is directly usable by the control unit 20 or the control unit 20 can include features necessary to interpret the input. Examples of input component-control unit features providing such interpreted inputs include: a voice recognition system including a microphone, a gesture recognition system including a line or array imager, and other such systems.

Figure 21:
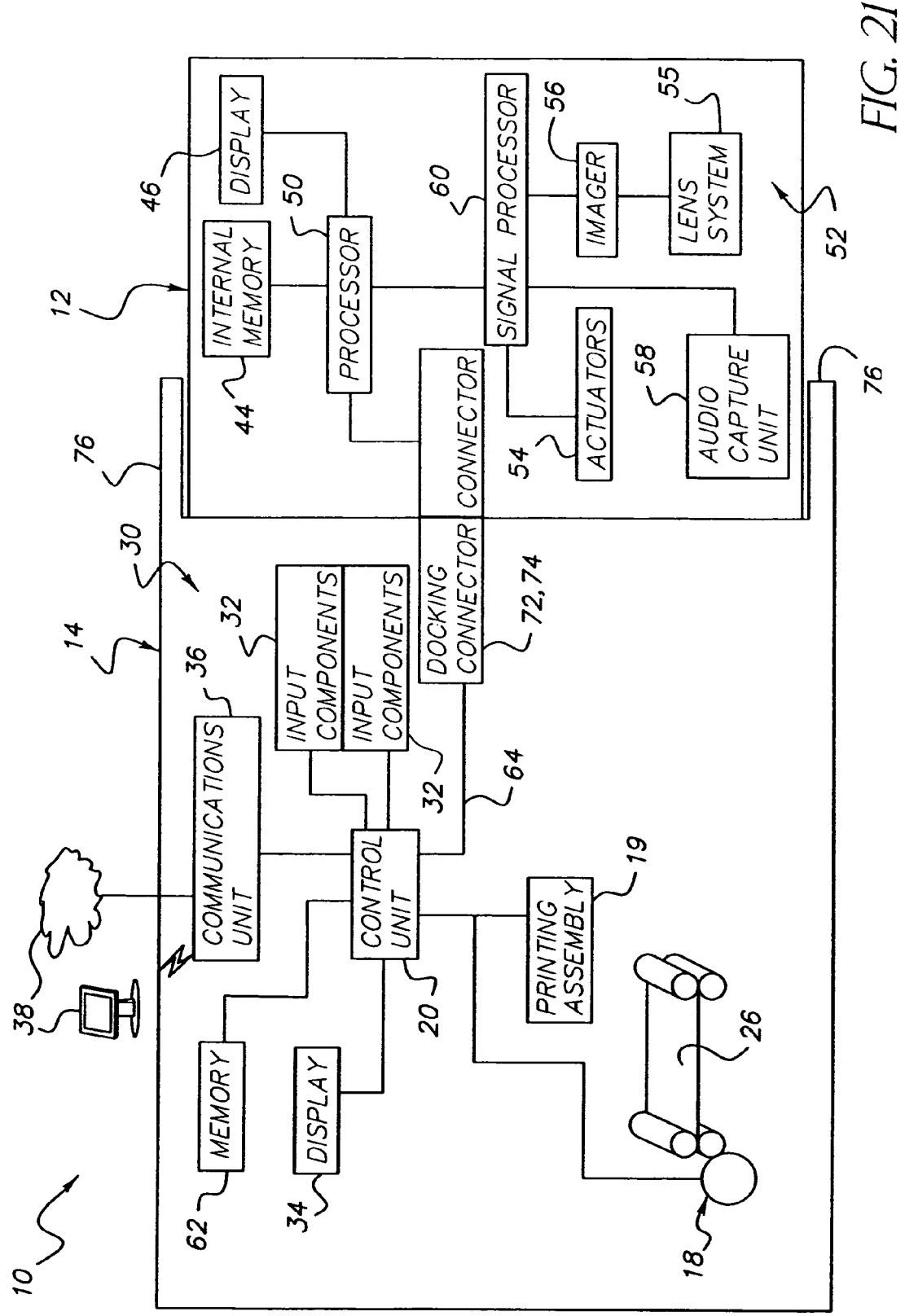
FIG. 21 is a diagrammatical view of another embodiment of the system.

Each output component 34 is a device capable of converting a signal from the control unit 20 to a form capable of perception by the user and sending that output to the user. Examples of such output components 34 include: a signal light, a display, a speaker or other audio signal generator, one or more light emitting diodes, and the like. FIG. 21 illustrates an embodiment, in which an output component 34 is a display. It will be understood that one or more of the display 46 and actuators of the data terminal 12 can be used in place of or in addition to components of the user interface 30. The printer dock 14 can be simplified on this basis, for example, by not providing a display in the printer dock 14 and instead requiring use of the display 46 in the data terminal 12.

The user interface 30 can be operated with the control unit 20 to control the operation of the printer engine 18. In a particular embodiment, the user interface 30 can be used to perform operations on images saved in the printer dock 14, such as, selecting among multiple images and modify image processing and printing of a selected image or images. Software needed to perform one or more of the operations. Software needed to perform particular operations can be stored in memory in the printer dock 14 or can be downloaded as necessary using the communications unit 36. Operations can also be performed in part on the printer dock 14 and in part on an external device or network 38. The user interface 30 can also control additional functions provided by the printer dock 14 and, optionally, can be used to control a docked data terminal 12 and/or a device connected via the communications unit 36. For example, the user interface 30 can be used to control the recording of images stored in printer dock memory 62 on a CD disk or DVD disk using a recorder provided as a part of the printer dock 14 or as a separate device 38 accessed through the communications unit 36.

The communications unit 36 provides for communication between the control unit 20 and one or more devices and/or networks 38 other than the data terminal 12 and, optionally, can include one or more connectors and/or other electrical circuit elements (not separately illustrated) of the power source 66 to allow supply of electrical power without use of the internal power supply or an additional power cord (not shown). The communications unit 36 can be wired or wireless or can combine wired and wireless capabilities in any combination. For example, the communications unit 36 can include an electrical interface connector, such as a connector meeting the universal serial bus (USB) interface specification or a wireless transceiver meeting the IEEE one three nine four interface specification or other cable interface or card interface specifications or a combination of two or more of these. The communications unit 36 is not limited to use of electrical signals and radio frequency signals for communication. For example, communications can be provided using "wired" optical connectors optical cables or and/or "wireless" infrared transmissions. It is convenient to connect the communications unit 36 to a personal computer, which is itself connected to a network, such as the Internet. The printer dock 14 can also be directly connected to a network or other device 38. For example, the communications unit 36 can connect wirelessly directly to a kiosk or another camera spaced apart from the printer dock 14. The communications unit 36 can also be used to provide communication with a remote control (not shown) that duplicates or takes the place of the user interface 30.

The device interface 28 is provided on the housing 16 and has a docking connector 72 that mates with a complementary docking connector 74 on the data terminal 12. The device interface allows transfer of images to the printer engine 18, charging of the data terminal battery, transfer of digital files, and other functions, such as, in some embodiments, transfer of display images to a display on the data terminal.

In the illustrated embodiments, the device interface 28 has a seat 76 that adjoins the printer dock docking connector 72 and is configured to hold the data terminal 12, such that the docking connectors 72,74 remain in engagement, when the data terminal 12 is docked and the housing 16 of the printer dock 14 is in an upright orientation. The printer engine 18 is capable of printing when the housing 16 is in the upright orientation and paper 26 is supplied. The upright orientation contrasts with a large number of other orientations the printer dock 14 can assume during transport.

The docking connector 72 can be mounted in a fixed orientation relative to the housing 16 or can be adjustable relative to the housing 16. For example, the docking connector 72 can be or can include a cable, such as a USB (Universal Serial Bus) cable, which engages the docking connector 74 of the data terminal.

Figure 2:
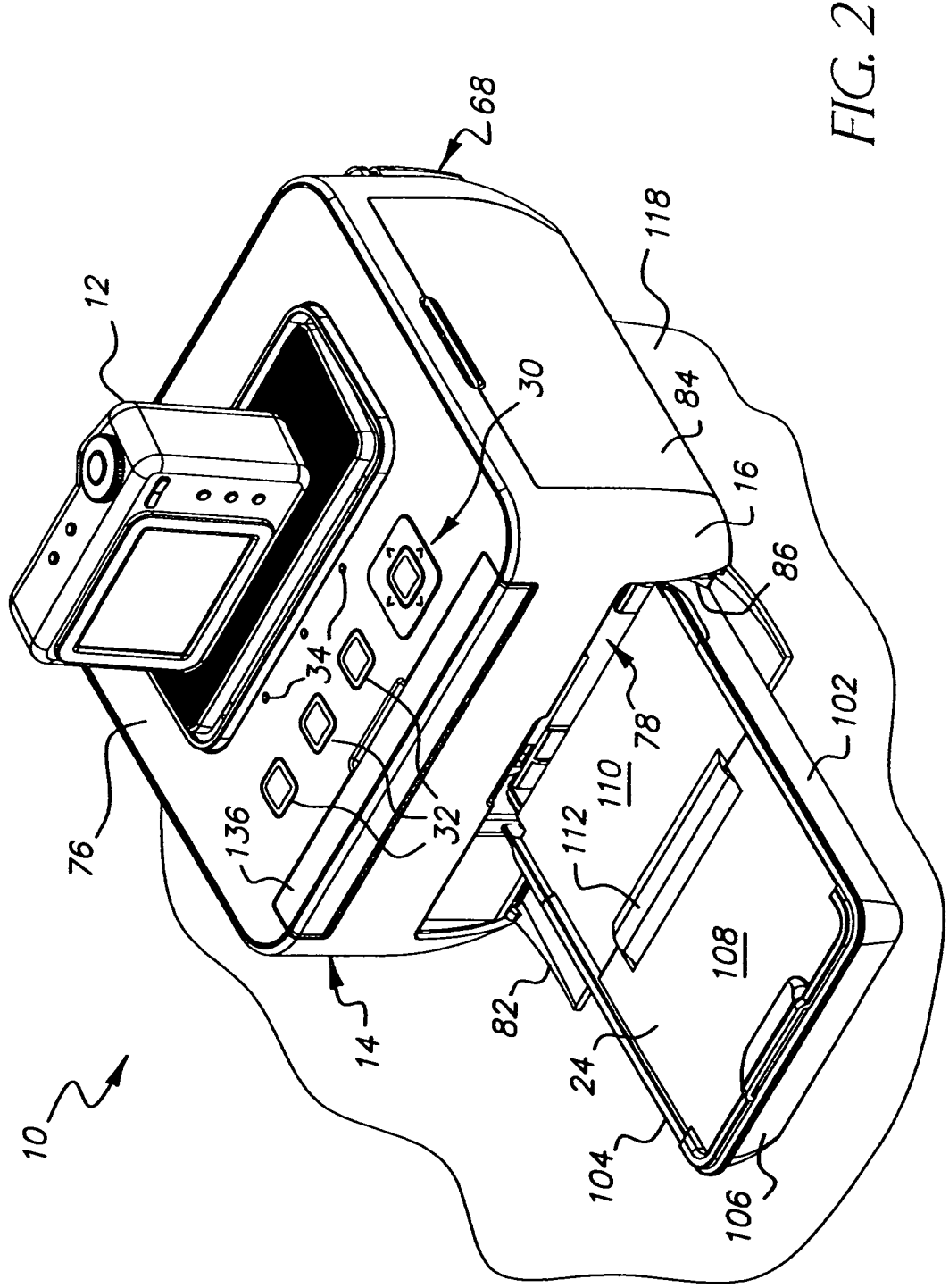
FIG. 2 is a right, front perspective view of a modification of the system of FIG. 1 resting in an upright position on a substrate. A battery case protrudes rearwardly from the housing of the printer dock. The tray is shown in the storage position. The handle is shown in the extended position. An optional power cord is not shown. The data terminal is a camera, which is docked with the printer dock.

The seat 76 can be configured so as to complement a particular type of camera or other data terminal 12, as shown in diagrammatically in FIG. 21, or can be configured to fit data terminals 12 of a number of different shapes, as shown in FIGS. 1-2. The former approach has the advantage of allowing a closer match to data terminal shape. The latter approach, shown in the figures, has the advantage of allowing more flexibility of use. It is highly preferred that the user interface 30 is configured so as to be fully accessible to the user when the data terminal 12 is docked.

The printer dock 14 and data terminal 12 can be configured to provide cooperative functions or even operate as a single unit when the data terminal 12 is docked. For example, in the embodiments illustrated in the figures, the printer dock 14 lacks an image display and instead uses the image display of the data terminal 12 for purposes such as selecting images for printing, editing images, adding text or other information to images, presenting images and the like. A wide variety of applications of this combination are described in greater detail in commonly assigned U.S. patent application Ser. No. 09/570,089 filed May 12, 2000, entitled "A COLOR DIGITAL PRINTER HAVING A GRAPHICAL USER INTERFACE 30 FOR DISPLAYING AND SELECTING IMAGES FROM A DIGITAL STORAGE MEDIUM" by Romano et al., and commonly assigned U.S. Application Publication No. 2005/0146616 filed Feb. 15, 2005, entitled "A PRINTING SYSTEM 10 AND METHOD HAVING A DIGITAL PRINTER THAT USES A DIGITAL CAMERA IMAGE DISPLAY" by Parulski et al.

The combination of a printer dock 14 and data terminal 12 can also be used to provide other functions. For example, referring to FIG. 21, the control unit 20 of the printer dock 14 can utilize the image capture system 10, audio capture system 10, signal processor 50, and/or other features of the digital camera. Similarly, memory capacity and/or processing capabilities of the docked data terminal 12 can be used by the control unit 20 to speed the processing of images for editing, printing or other purposes or to allow functions that would not be available in the printer dock 14 in the absence of a docked data terminal 12. For example, the control unit 20 can be programmed to perform advanced image editing techniques that require use of the memory 44 and signal processor 50 of a docked data terminal 12.

Figure 7:
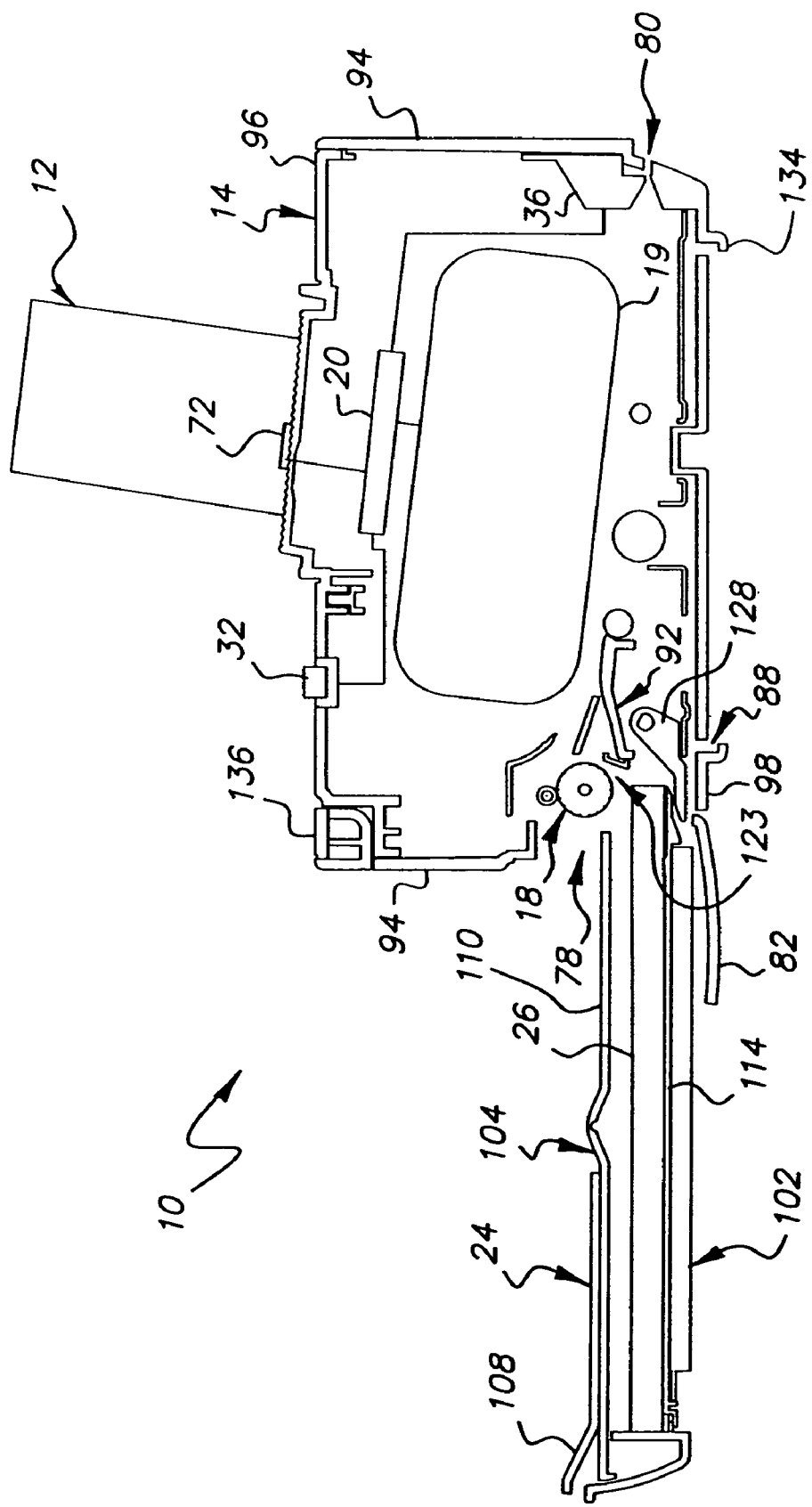
FIG. 7 is a semi-diagrammatical, cross-sectional view of the system of FIG. 2 taken substantially along the line 7-7 of FIG. 2. The paper tray is in the use position. The camera, which is shown as a box, is docked. The paper advance is not actuated.
Figure 8:
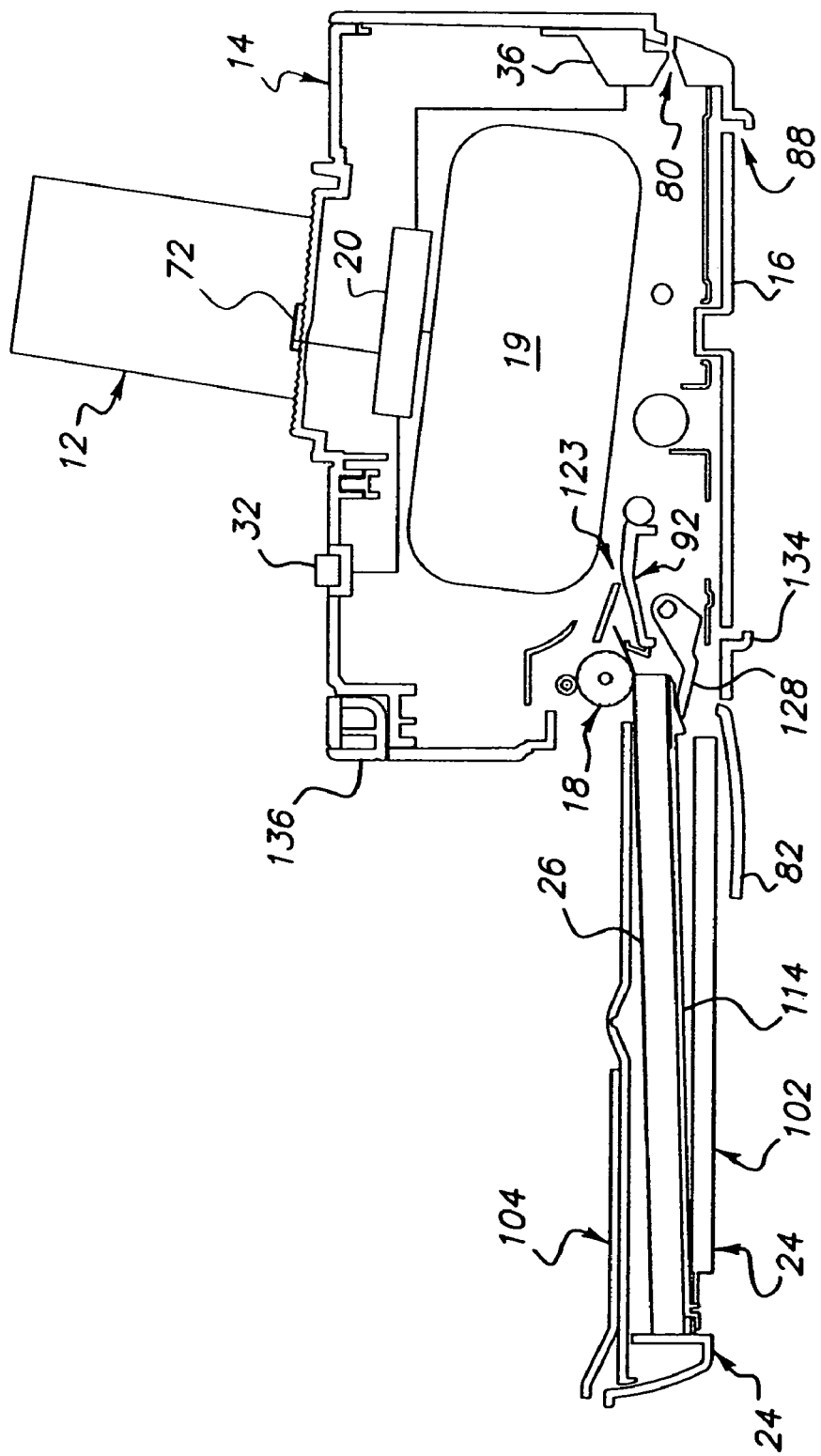
FIG. 8 is the same view as FIG. 7, but the paper advance is actuated. The lifter of the paper advance has raised the paper stack. The pickup has engaged the first sheet.

Referring now to FIGS. 2 and 7-8, the housing 16 of the printer dock 14 has a paper inlet portal 78, through which paper 26 is supplied to the printer engine 18. The housing 16 also has a paper outlet portal 80, through which the paper 26 can exit the housing 16. In the illustrated embodiment, the paper outlet portal 80 is opposite the paper inlet portal 78, but the relative locations of the two portals 78,80 can be varied to meet the requirements of a particular printer engine 18. The paper 26 inlet and outlet portals 78,80 can coincide, but for most types of printer engine this is expected to be inconvenient. In the illustrative embodiment, the paper inlet portal 78 is adjoined by a paper portal door 82 that can be closed to prevent entry of dust or other foreign matter when the printer dock 14 is not being used. In the illustrated embodiment, the housing 16 also has a media accessway (not shown) that is covered by another door 84. The accessway is used in replacing a consumable supply in the printer engine 18. In the illustrated embodiment, the printer engine 18 is a thermal transfer printer engine and the consumable supply is a thermal printer ribbon cartridge (not shown).

Referring now to FIGS. 2-3 and 7-8, the housing 16 has a first or active tray receiver 86 and one or more second or storage tray receivers 88. The first tray receiver 86 adjoins the paper inlet portal 78 and is shaped so as to accept the forward end 90 of the paper tray 24. The paper tray 24 is mountable in the first tray receiver 86 in a use position, in which a pickup mechanism 92 of the printer engine 18 can pull sheets of paper 26 from the tray 24 seriatim. In the use position, the paper tray 24 protrudes from the paper inlet portal 78 outward away from the housing 16 of the printer dock 14. In the illustrated embodiment, the paper tray 24 extends outward over the open paper portal door 82.

Figure 9:
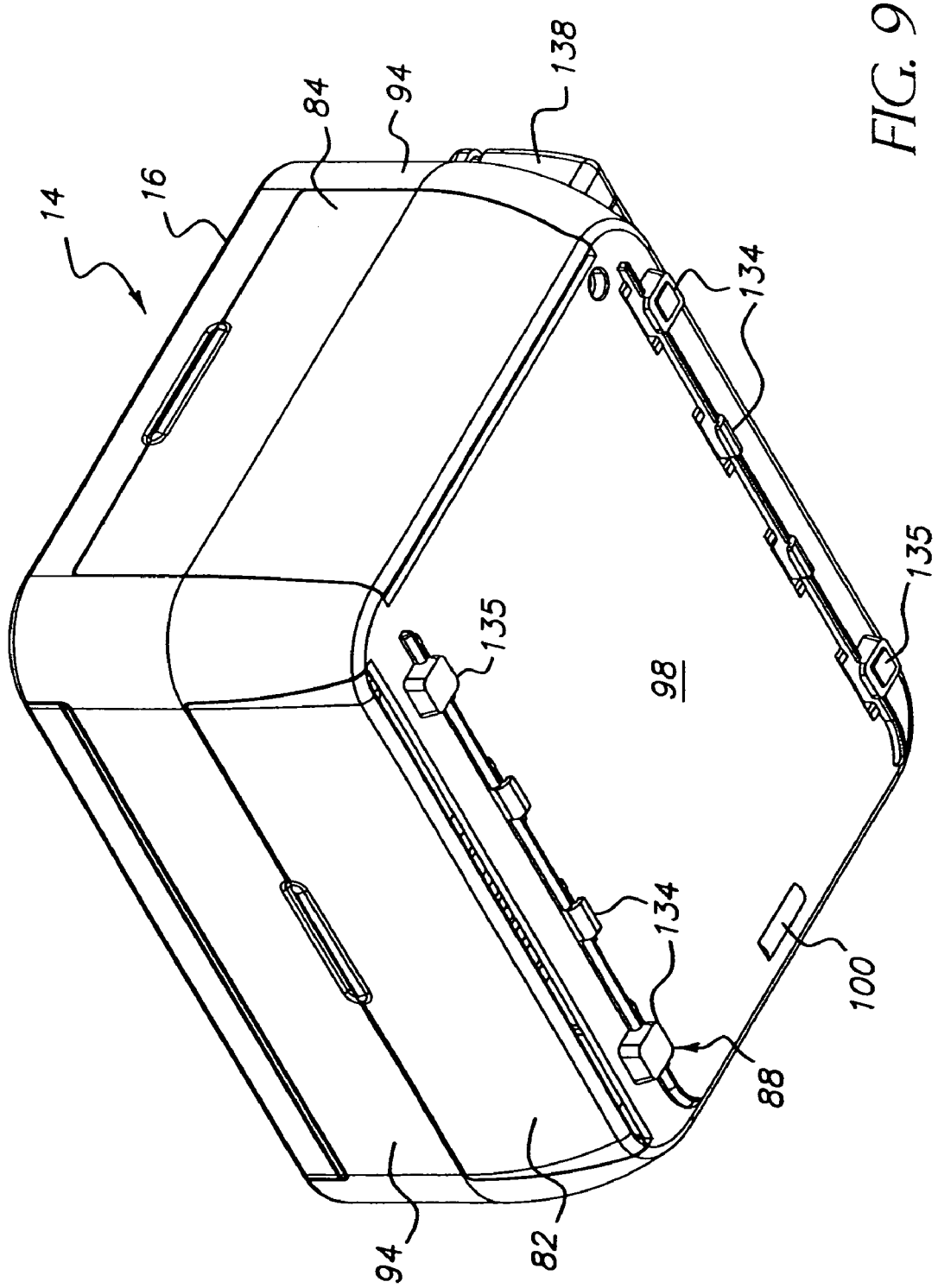
FIG. 9 is a bottom, right perspective view of the housing of the printer dock of FIG. 1. The second tray receiver is empty.

Referring to FIGS. 7-9, a second tray receiver 88 is spaced from the paper inlet portal 78. The paper inlet portal 78 and first tray receiver 86 are on a side 94 of the housing 16 and the second tray receiver 88 is on the top 96, bottom 98, or other side 94 of the housing 16. The second tray receiver 88 closely accepts the paper tray 24 in a second or storage position. The paper tray 24 is held in the storage position by friction with the second tray receiver 88 or by a holder 100, such as a detent that resiliently binds the paper tray 24, a dog that wedges the paper tray 24, a hatch that blocks exit of the paper tray 24, or the like. In the illustrated embodiment, a molded-in catch resiliently grips the paper tray 24. A slight flexibility of the tray 24 allows for loading and release of the tray 24.

Referring to FIGS. 2-4, and 7-8, the paper tray 24 has a main portion 102 and a cover 104. The cover 104 is pivotable about the rearward end 106 of the of the paper tray 24. The cover 104 is movable relative to the main portion 102 at the rearward end 106 of the paper tray 24. The cover 104 has a hatch 108 and a panel 110 that are joined together by a transverse hinge 112. When the hatch 108 of the paper tray 24 is manually pivoted back over and onto the panel 110 prior to manual insertion of the paper tray 24 into the first tray receiver 86. With the hatch 108 in this position, the forward end 90 of the paper tray 24 is open and accessible to the pickup mechanism 92 of the printer engine 18. The paper tray 24 can be manually removed from the first tray receiver 86 when not in use. At that time, the hatch 108 of the cover 104 can be pivoted back over the forward end 90 of the paper tray 24 fully enclosing the top of the paper tray 24.

Figure 10:
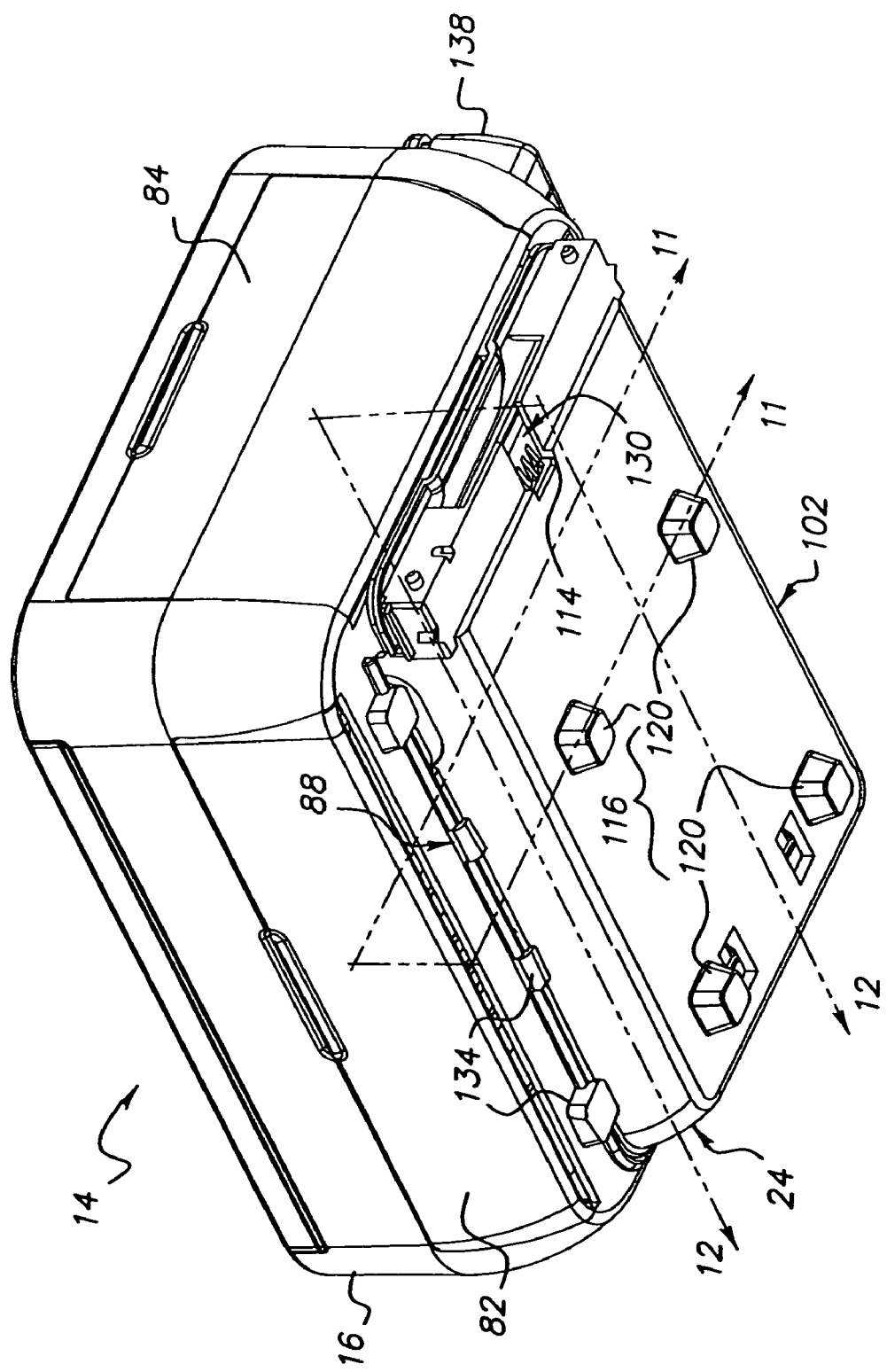
FIG. 10 is the same view as FIG. 9, but the paper tray is in the storage position in the second tray receiver.

The paper tray 24 has a paper support 114 facing the cover 104 and opposite the paper support 114, a base 116 that holds the paper tray 24 at an appropriate height relative to the first tray receiver 86 on a substrate 118 that supports both the paper tray 24 and the housing 16 of the printer dock 14 in the upright orientation. To reduce weight, the base 116 can be provided in the form of several separate legs 120. Referring to FIG. 10, four legs 120 protrude downward from the paper support 114.

Figure 5:
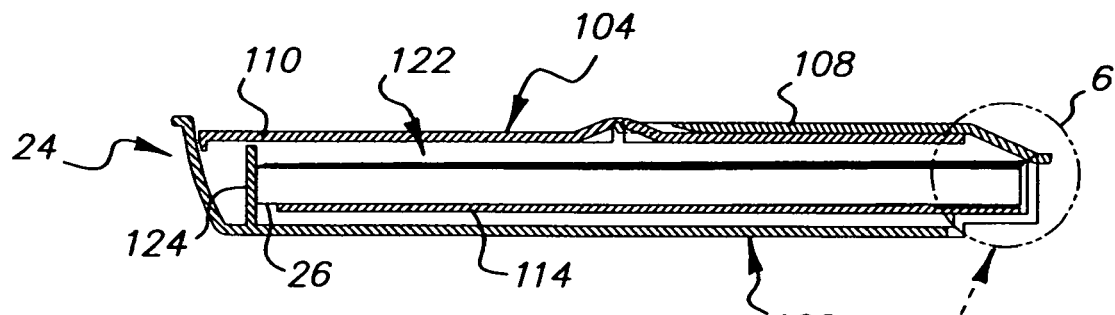
FIG. 5 is a cross-sectional view of the tray of FIG. 3 taken substantially along line 5-5 of FIG. 3. The cover is fully closed.
Figure 6:
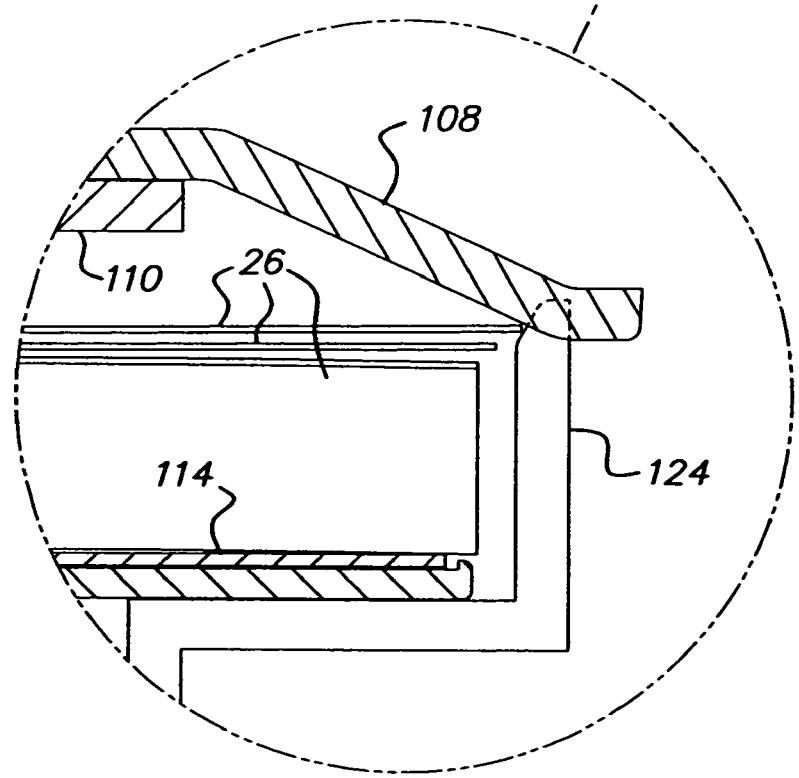
FIG. 6 is a partial enlargement of the cross-sectional view of the FIG. 5 taken from circle 6 of FIG. 5.

The tray 24 defines a media chamber 122 between the paper support 114 and cover 104. The media chamber 122 has substantially the same shape as a stack of paper 26 and is bordered on three or four sides by sidewalls 124 of the main portion 102 of the tray 24. The sidewalls 124 can be continuous or can be interrupted in one or more places and may or may not be outer walls of the main portion 102. Continuous or nearly continuous sidewalls add weight relative to interrupted sidewalls, but can help protect loaded paper 26 from entry of foreign matter and the like. In a particular embodiment, as shown in FIGS. 5-6, the front of the hatch .108 and the front sidewall 124 engage, such that if paper 26 resting on the paper support 114 is propelled forward, the paper 26 is deflected by the hatch 108 against the front sidewall 124. This reduces the risk that paper will be expelled between the front sidewall 124 and hatch 108.

It is preferred that the width and length of the tray 24 in directions corresponding to the major dimensions of paper 26 loaded in the tray 24 are each greater than the height in the direction corresponding to the height of a stack of paper 26 loaded in the tray 24. This provides for easier carrying of the printer dock 14.

Referring to FIGS. 7-8 and 10, the printer engine 18 has a medium advance 21 that is used to remove a sheet of paper 26 from the medium chamber 122 in the tray 24 and drive the paper 26 along a paper path 123 through or past a printing assembly 19 as an image is recorded on the paper 26 by the printing assembly 19 of the printer engine 18. The medium advance 21 can comprise any number of well-known systems for moving the paper 26, including a motor driving pinch rollers, a motorized platen roller (not shown), one or more belts, or other well-known systems for the movement of a sheet of printable medium. In the illustrated embodiment, the medium advance 21 includes a lifter 128 that protrudes upward through a gap 130 in the bottom of the paper tray 24 and pushes against the paper support 114, raising the stack of paper 26 into a position that a pickup 132 can engage the sheets one by one.

Referring to FIGS. 7-10, in the illustrated embodiment, the second tray receiver 88 is in the form of slotted protrusions 134 that receive the cover 104 of the paper tray 24. Multiple protrusions 134 are provided on each side. Alternative engagement structures, such as a continuous protrusion and slot, magnetic features, hook and eye fasteners, or other fasteners could instead be provided. Likewise, the main portion 102 can be held rather than cover 104 of the paper tray 24 or both can be held. Some or all of the protrusions 134 can be shaped so as to provide an alternative base for the housing 16. In the illustrated embodiment, four of the protrusions are shaped to form feet 135.

Figure 3:
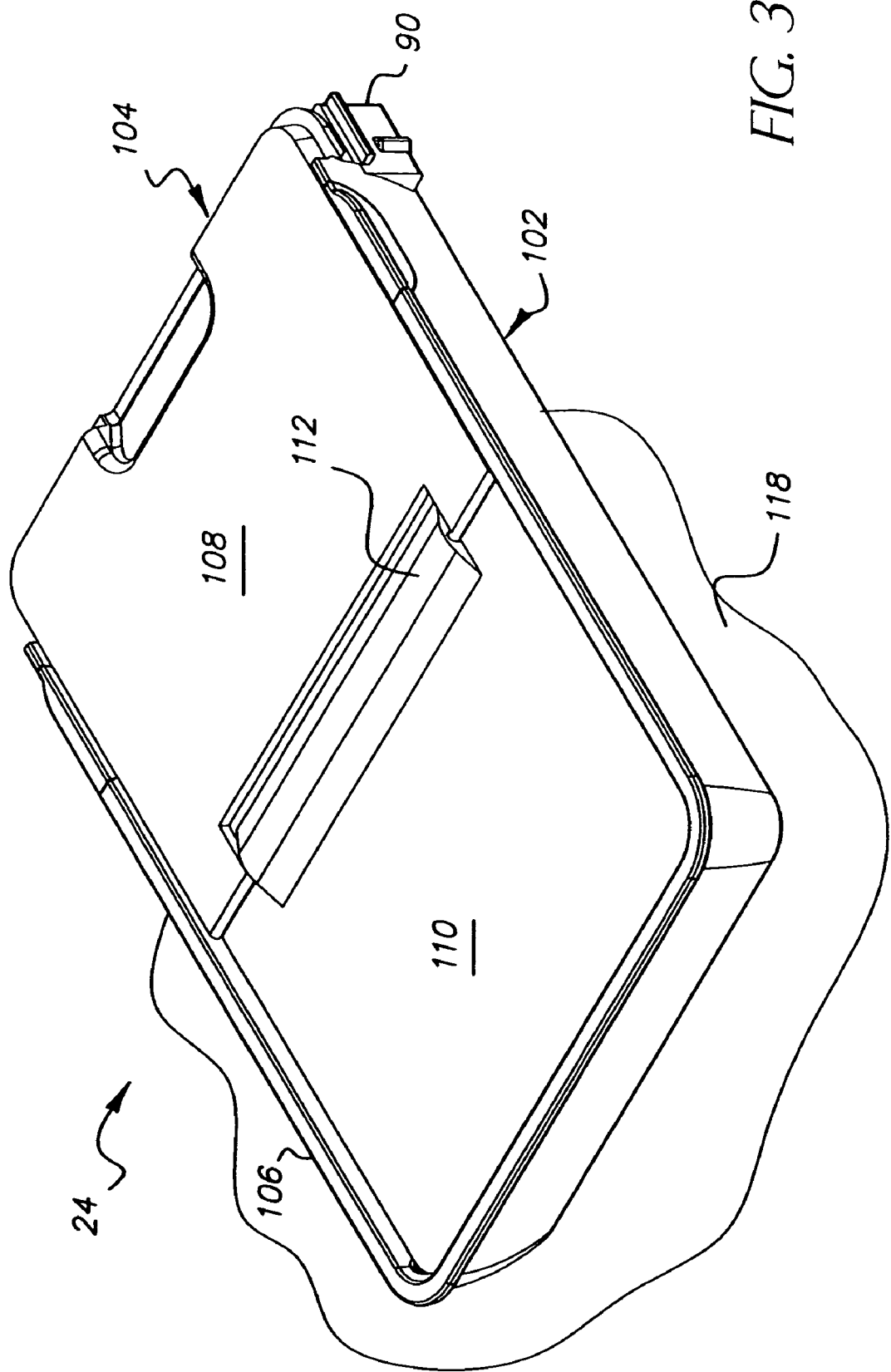
FIG. 3 is a top perspective view of the tray of FIG. 1 resting on a substrate. The tray is shown in a fully closed position.
Figure 4:
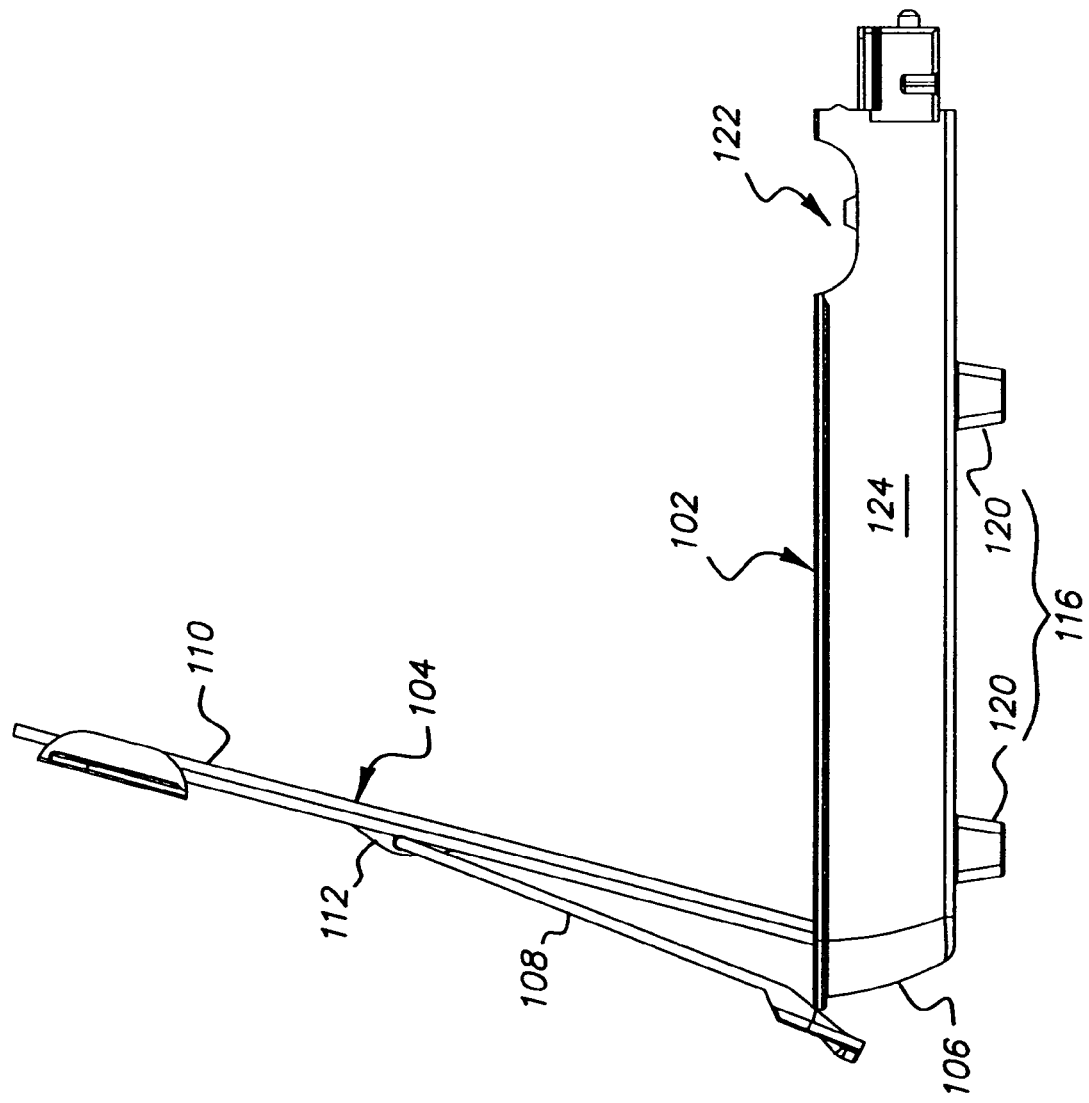
FIG. 4 is a side view of the tray of FIG. 3. The cover is shown in a raised position for paper loading. The hatch of the tray is shown pivoted back.

In this embodiment, the cover 104 is snapped onto the main portion 102 of the tray 24, which remains inseparable from the cover 104 while in the storage position. As shown in FIG. 3, the paper tray 24 can rest on a horizontal substrate 118 in the storage position with the hatch 108 of the cover 104 closed. This helps ensure that the paper 26 remains in the paper tray 24 and helps protect the paper 26.

Figure 11:
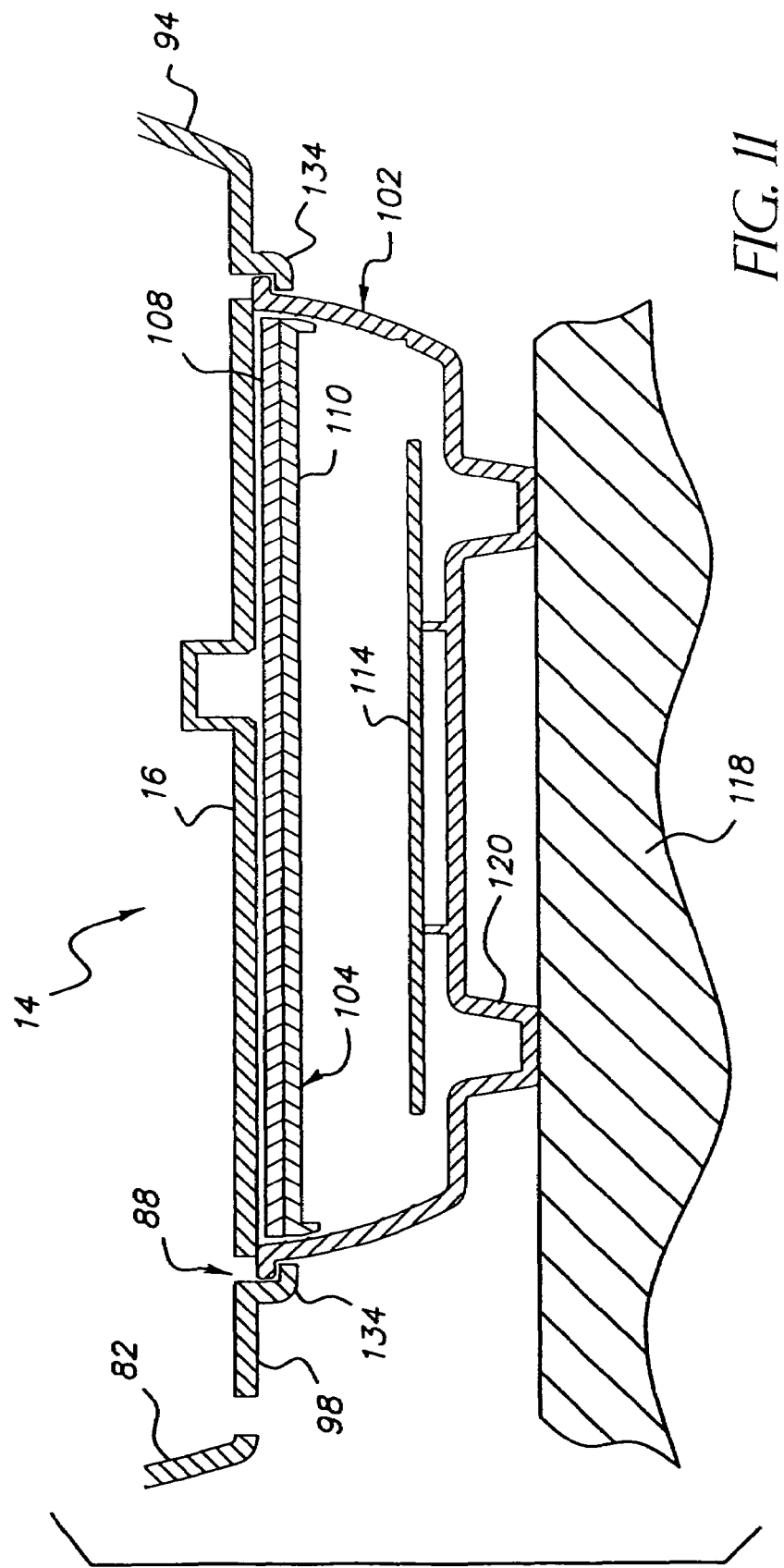
FIG. 11 is a partial cross-sectional view of the housing and receiver of FIG. 10 taken substantially along line 11-11 of FIG. 10, with the printer dock resting on a substrate.
Figure 12:
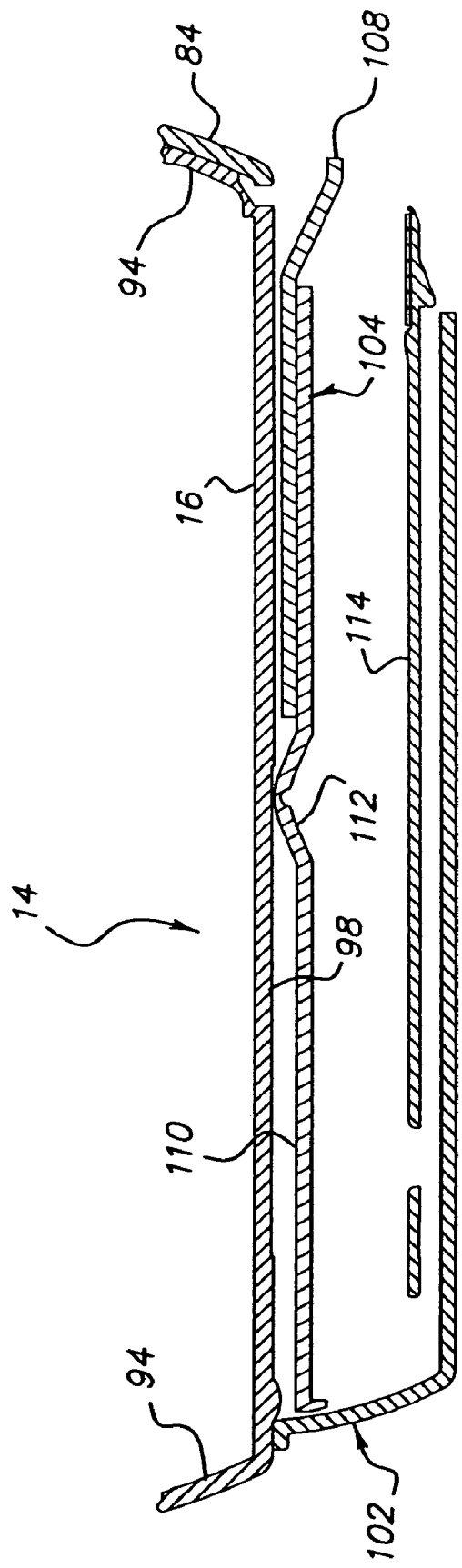
FIG. 12 is a partial cross-sectional view of the housing and tray of FIG. 10 taken substantially along line 12-12 of FIG. 10.
Figure 13:
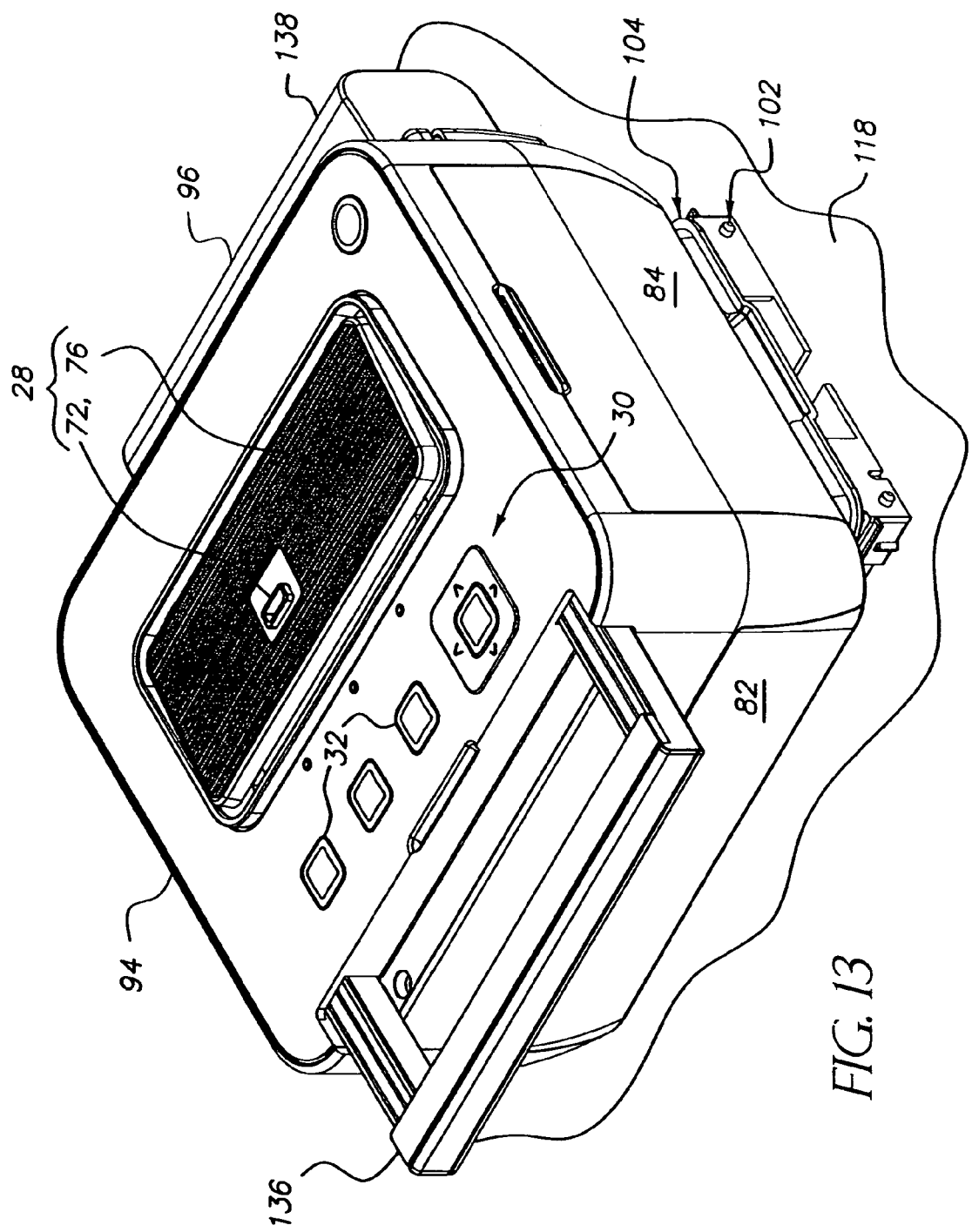
FIG. 13 is a front, right perspective view of the printer dock of FIG. 1 resting on a substrate. The handle is in the extended position. The tray is in the storage position.

Referring to FIGS. 11-13, in a particular embodiment, the second tray receiver 88 is located such that the housing 16 can rest in an upright position on the tray 24, when the tray 24 rests on a horizontal substrate 118. This allows a camera to be retained in the seat 76 for charging and file transfer, with the paper tray 24 in the storage position. In this manner, the overall footprint of the printer dock 14 is greatly reduced. The printer dock 14 is also available for transport by simply removing the data terminal 12, disconnecting the power cord and/or computer/network connectors, and then lifting the printer dock 14.

Referring to FIGS. 1-2 and 13-16, in a particular embodiment, the printer dock 14 includes a handle 136 for convenience in transport. The handle 136 can be configured so as to slide in and out of the housing 16 between retracted and extended positions, reducing the space required when the printer dock 14 is not being carried. It is desirable to store many kinds of printable media, with the media lying flat. In a particular embodiment, the first and second tray receivers 86,88 are parallel and receive the paper tray 24 in an orientation in which the paper 26 is horizontal, when the printer dock 14 is in an upright position. The largest dimensions of the tray receivers 86,88 are horizontal, as are the largest dimensions of the paper tray 24 when positioned in either of those receivers 86,88. As a result, the horizontal dimensions of the printer dock 14 are relatively large. The vertical dimension of the printer dock 14, when the printer dock 14 is in an upright position, can be relatively small. With this arrangement, is convenient to locate the handle 136 of the printer dock 14 on one of the sides 94 of the housing 16. This allows the printer dock 14 to be carried at an angle that is transverse to its ordinary upright position that is less cumbersome than would be the case, if the printer dock 14 were carried in the upright position. On the other hand, it is undesirable for the printer dock 14 to be stored in a position, in which the paper 26 is not horizontal. In a particular embodiment, the printer dock 14 has a welt 138 that extends outward from the side of the housing 16 opposite the handle 136. The welt 138 is sufficiently rounded to render the printer dock 14 unstable to rotation from a transport orientation in which the handle is uppermost, to another orientation.

Figure 14:
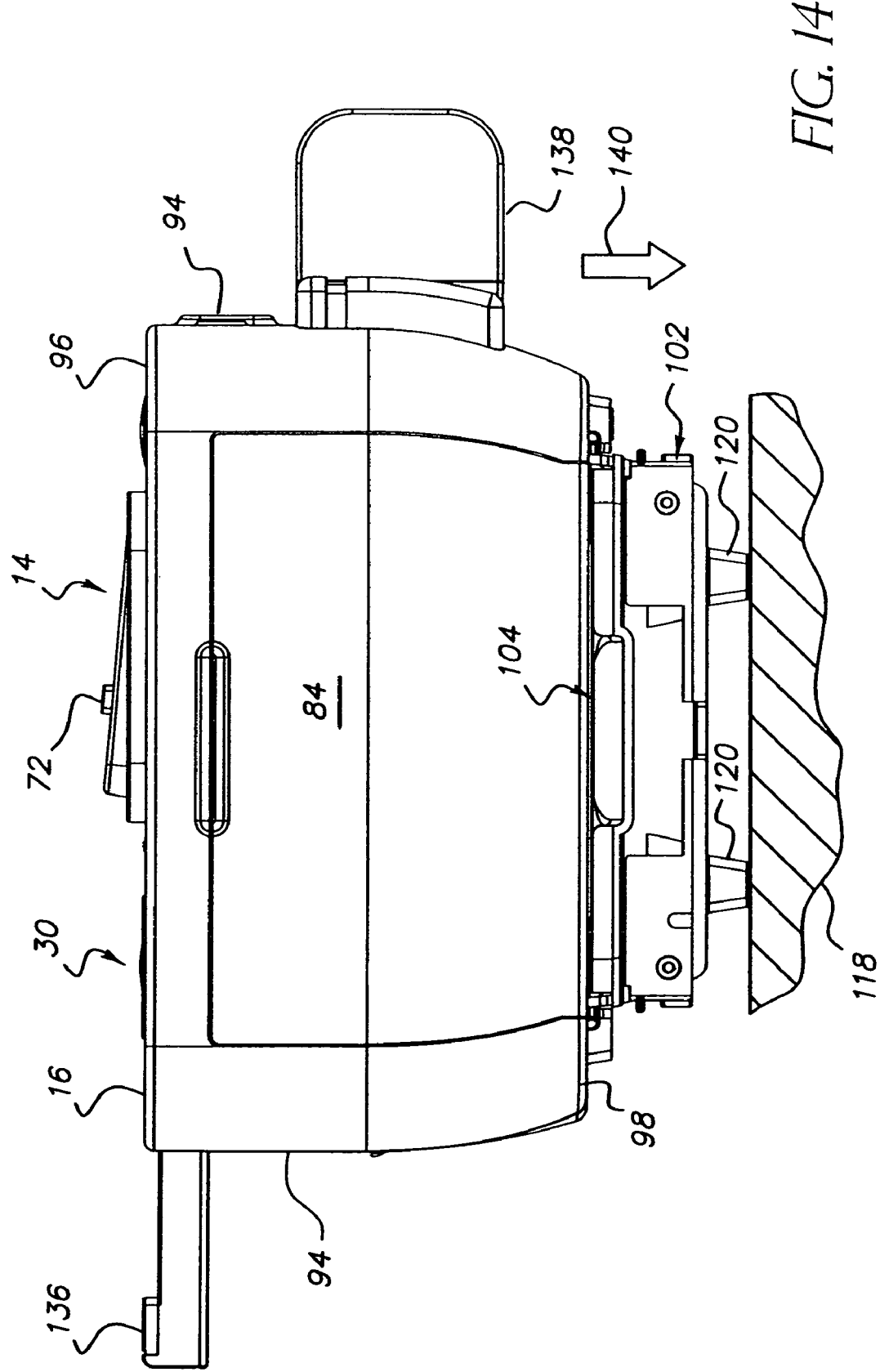
FIG. 14 is a side view of the printer dock of Figure thirteen showing the tray and housing of the printer dock at rest on a substrate. An arrow indicates a downward direction.
Figure 15:
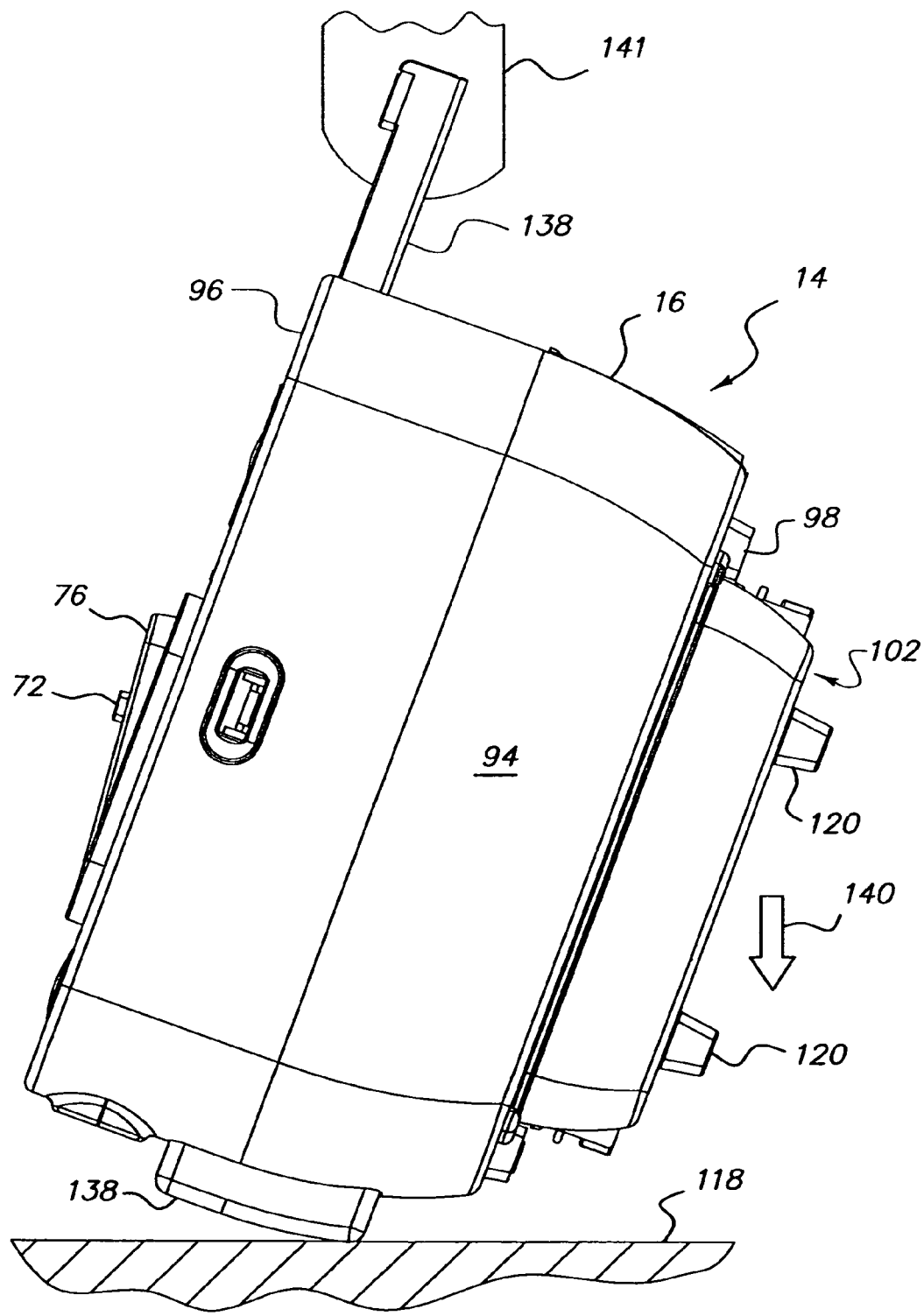
FIG. 15 is a side view of the printer dock of FIG. 14 showing the printer dock at the moment of placement by a user (illustrated as a stylized hand) onto a support surface. The arrow indicates the direction down.
Figure 16:
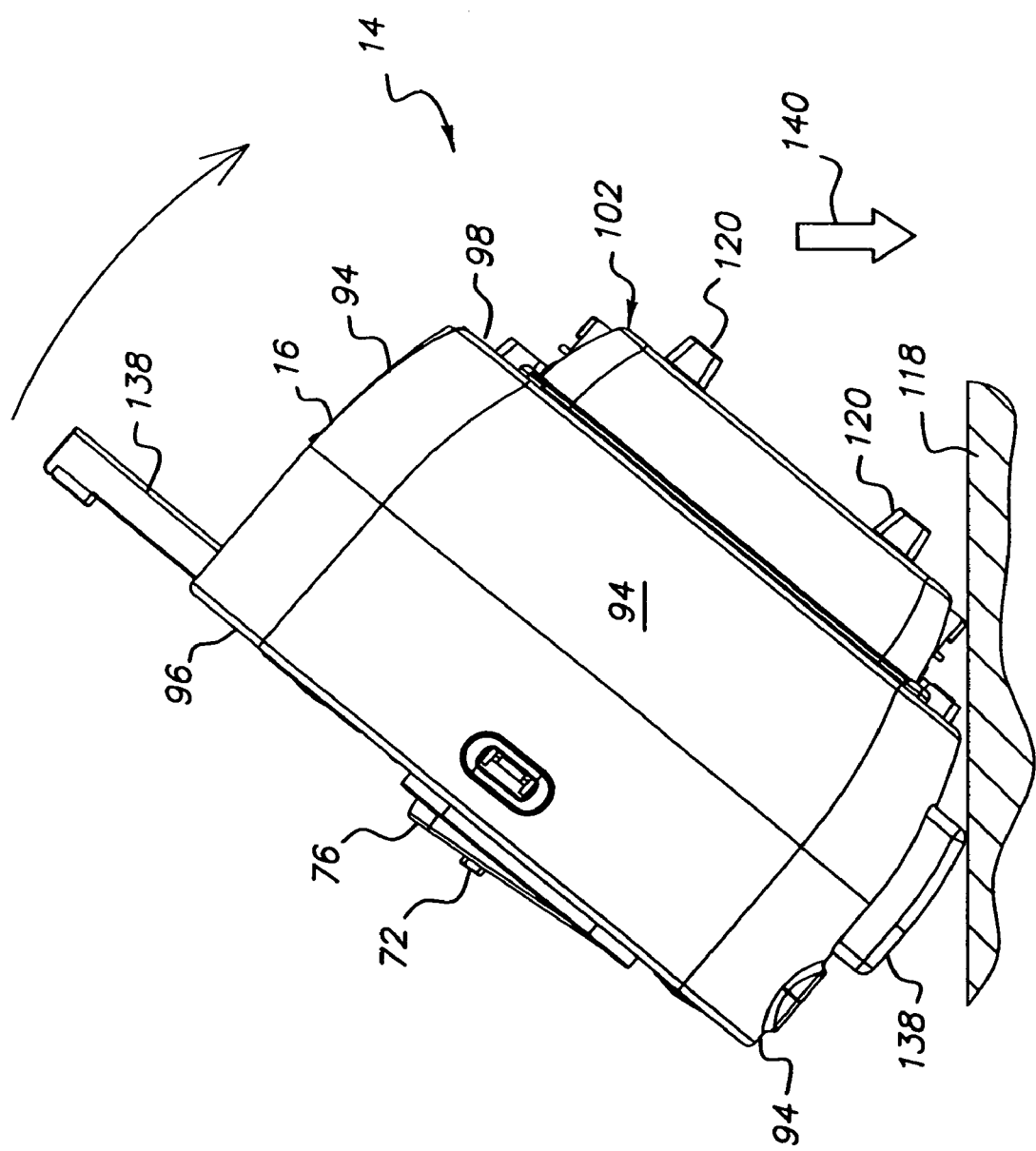
FIG. 16 is the same view as FIG. 15, but the printer dock is shown pivoting from the orientation shown in FIG. 15 into the rest position shown in FIG. 13. The direction of pivoting is indicated by a narrow arrow. A wide arrow indicates the direction down.

Referring to FIGS. 14-16, in a particular embodiment, the handle 136 is offset relative to the center of gravity of the printer dock 14. (A downward direction is indicated by arrow 140. A user's hand 141 is also shown.) This handle 136 location biases the printer dock 14, when placed on the welt 138, to rotation from the transport orientation to the upright orientation. This causes the printer dock, when placed on the welt 138, to pivot downward onto the legs 120 or other base 116 of the stored paper tray 24 and results in the printer dock 14 assuming the upright position shown in FIG. 14. In a particular embodiment, the welt 138 is a battery case for a battery (not shown) that can be used to power the printer engine 18.

Referring to FIG. 15, in particular embodiments, the presence of the tray 24 in the second tray receiver 91 during transport provides a protective function, since the paper tray 24 extends beyond the housing 16. The paper tray 24 can absorb at least some of the shock of impacts while the printer dock is carried and, in some orientations, when the printer dock is dropped. The paper tray can be made of materials that absorb the impacts and/or can be more readily replaced than the other parts of the printer dock.

The printer engine 18 is operable when the housing 16 is at rest in the upright orientation, the paper tray 24 is in the use position, and the paper tray 24 and housing 16 are both directly supported by a substrate 118, as shown in FIG. 2. The seat 76 also supports the data terminal 12, such that the docking connectors 72,74 remain connected. In the particular shown in FIGS. 1-2, the paper tray 24, when in the storage position, supports the housing 16 in spaced relation to a substrate 118, when the printer dock 14 is at rest in the upright orientation. The seat 76 again supports the data terminal 12, such that the docking connectors 72,74 remain connected.

Figure 17:
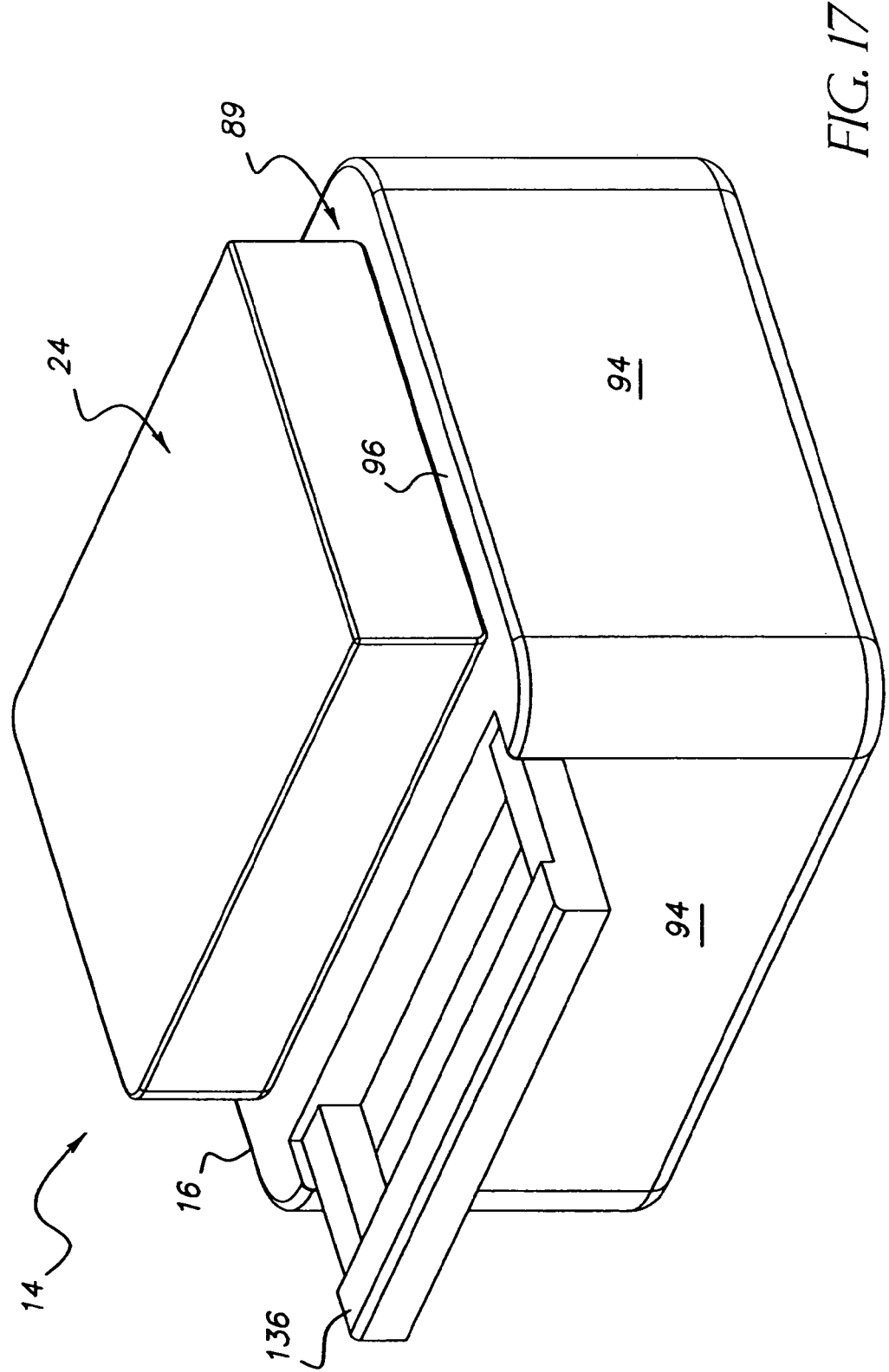
FIG. 17 is a front, right perspective view of another embodiment of the printer dock. The tray is shown in a storage position over the user interface. The handle is shown in an extended position.
Figure 18:
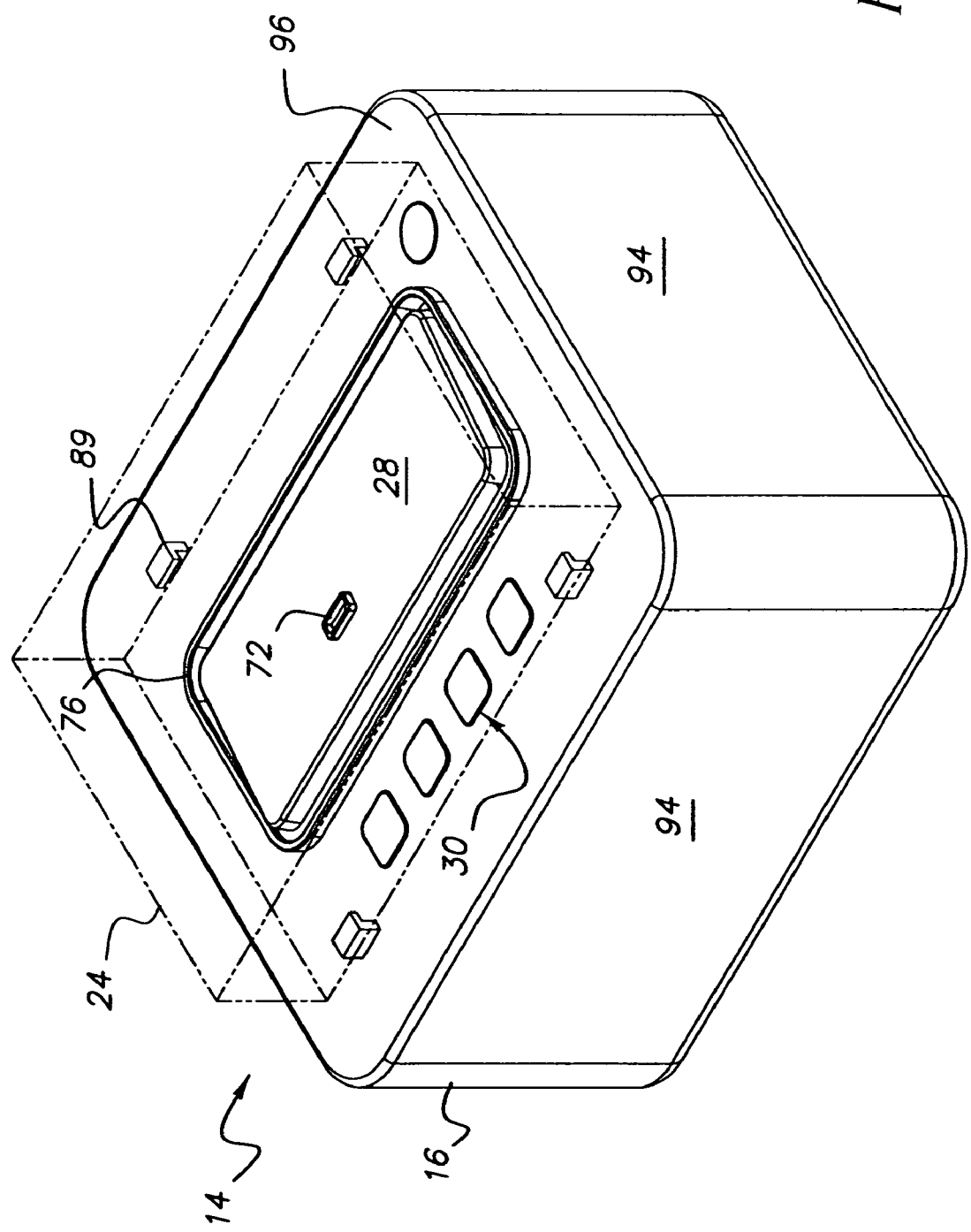
FIG. 18 is the same view as FIG. 17, but the paper tray is illustrated by a dash-dot line to show the relative position of the user interface. The handle is not shown.

In an alternative embodiment shown in FIGS. 17-18, the second tray receiver 89 is on the top 96 of the housing 16. This embodiment, which is otherwise like those earlier discussed, allows the paper tray 24 to protect the user interface 30 and device interface 28 when the paper tray 24 is in the storage position. The interfaces 28,30 can be recessed or an extension can be added (not shown) to the tray 24 to prevent interference between the interfaces 28,30 and the tray 24.

Figure 19:
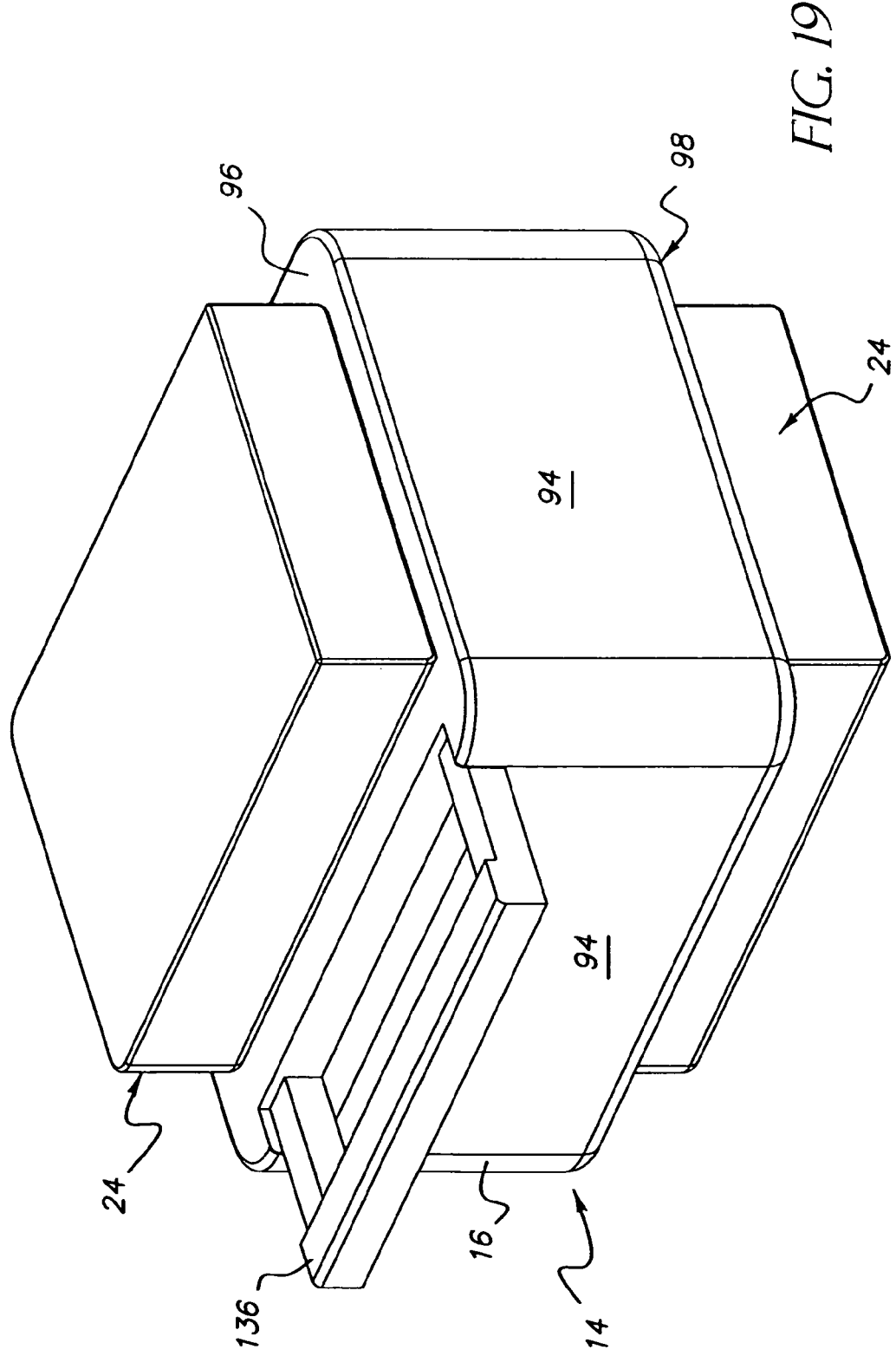
FIG. 19 is a front, right perspective view of another embodiment of the printer dock. First and second paper trays are shown in respective storage positions.

Another embodiment shown in FIG. 19 has two trays 24. The two trays 24 can hold different sizes or types of paper. Both trays 24 can be stored on the printer dock 14 in two opposed second tray receivers 88,89 (not shown in FIG. 19) on the top and bottom of the housing 16. This embodiment allows more flexibility in terms of paper selection, but is more cumbersome to transport.

Figure 20:
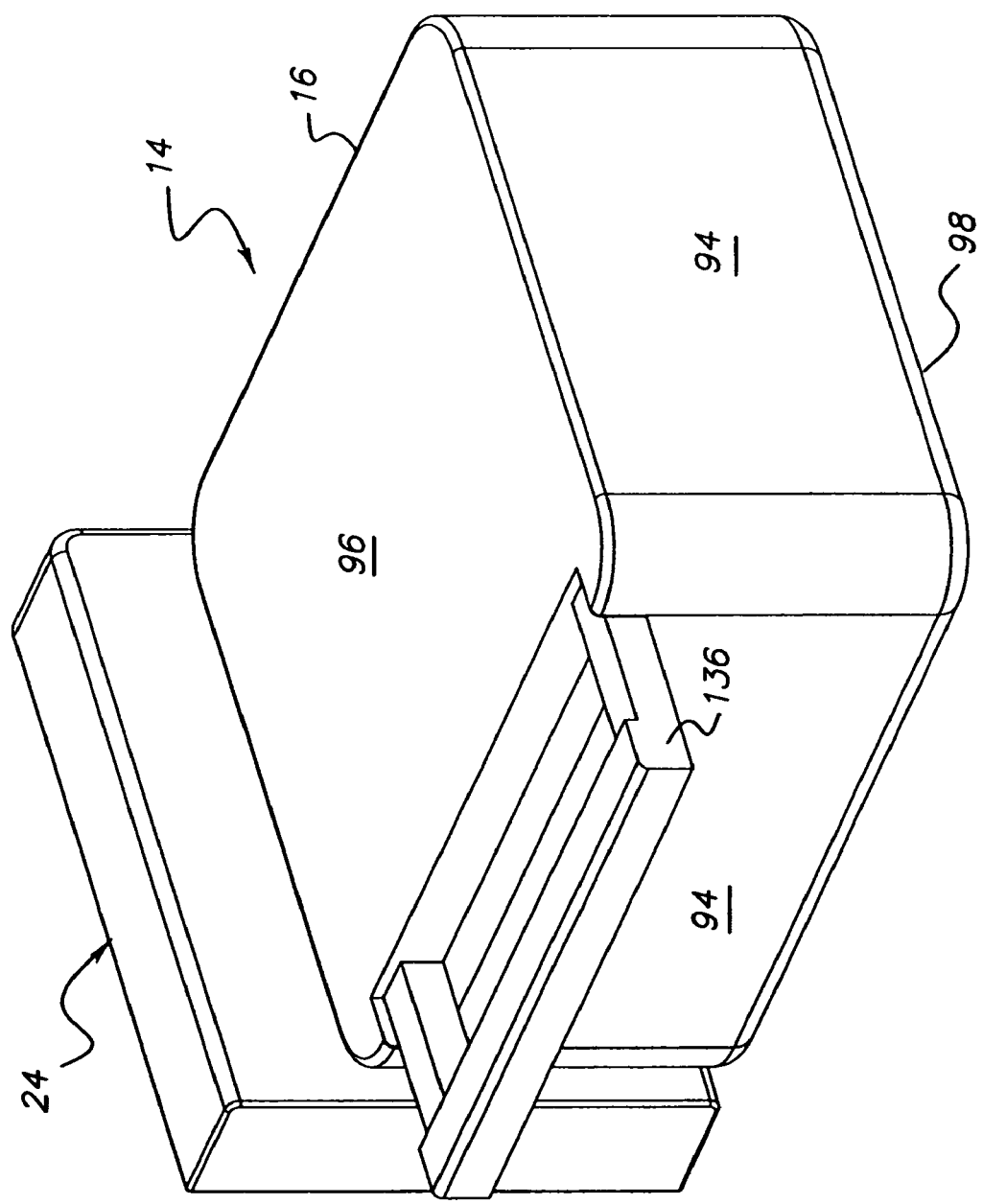
FIG. 20 is a right, front perspective view of another embodiment of the printer dock. The paper tray is shown in a storage position along one of the sides of the printer dock.

Still another embodiment is shown in FIG. 20, in which the tray 24 is in a storage position in a second tray receiver (not shown) located on one of the sides 94 of the housing 16. Another tray receiver 91 could be provided on the opposite side 94 if desired.

The invention has been described in detail with particular reference to certain preferred embodiments thereof, but it will be understood that variations and modifications can be effected within the spirit and scope of the invention.

The invention claimed is:

1. A printer dock for use with a data terminal, the printer dock comprising:
   a housing having a paper inlet portal, a first tray receiver, and a second tray receiver, said first tray receiver adjoining said paper inlet portal, said second tray receiver being disposed in spaced relation to said paper inlet portal;
   a printer engine disposed in said housing, said printer engine having a paper path extending from an entrance facing said paper inlet portal;
   a docking connector operatively connectable to the data terminal, said docking connector being operatively connected to said printer engine;
   a seat adjoining said docking connector, said seat being adapted to hold said data terminal in engagement with said docking connector when said housing is at rest in an upright orientation; and
   a paper tray alternately mountable in a use position in operative relation to said printer engine in said first tray receiver and in a storage position within said second tray receiver; and
   wherein said paper tray covers said seat and said docking connector in said storage position.

2. The printer dock of claim 1 wherein said seat is disposed opposite said second tray receiver.

3. The printer dock of claim 1 wherein said paper tray has a paper support and a base opposite said paper support, said base supporting said paper tray when said paper tray is in said use position and said housing is at rest in an upright orientation, said base supporting said paper tray and said housing when said paper tray is in said storage position and said housing is at rest in said upright orientation, said printer engine being operable when said housing is in said upright orientation.

4. The printer dock of claim 3 wherein said use position and said storage position are parallel.

5. The printer dock of claim 4 further comprising a handle mounted to said housing between said seat and said first and second tray receivers.

6. The printer dock of claim 5 further comprising a welt extending outward from said housing opposite said handle, said welt being sufficiently rounded to render said printer dock unstable to rotation from a transport orientation, wherein said handle is uppermost, to said upright orientation.

7. The printer dock of claim 6 wherein said welt further comprises a battery case operatively connected to said printer engine.

8. The printer dock of claim 1 wherein said paper tray has an openable cover opposite said base, said cover being disposed above said base when said housing is in said upright orientation and said paper tray is mounted in said first tray receiver and when said housing is in said upright orientation and said paper tray is mounted in said second tray receiver.

9. A data terminal and dock system comprising:
a printer dock including:

a housing having a paper inlet portal, a first tray receiver, and a second tray receiver, said first tray receiver adjoining said paper inlet portal, said second tray receiver being disposed in spaced relation to said paper inlet portal;

a printer engine disposed in said housing, said printer engine having a paper path extending from an entrance facing said paper inlet portal;

a charging unit disposed in said housing;

a data terminal nest having a docking connector operatively connected to said printer engine and said charging unit, and a seat adjoining said docking connector; and a paper tray alternately mountable in a use position in operative relation to said printer engine in said first tray receiver and in a storage position within said second tray receiver and said paper tray covers said seat and said docking connector in said storage position; and a data terminal releasably placeable in said data terminal nest to connect said docking connector and transfer information and a charging current.

\* \* \* \* \*